United States Patent [19]

Gassmann et al.

[11] Patent Number: 4,710,814
[45] Date of Patent: Dec. 1, 1987

[54] TELEVISION SOUND RECEIVING CIRCUIT FOR AT LEAST ONE SOUND CHANNEL CONTAINED IN AN RF SIGNAL

[75] Inventors: Gerhard G. Gassmann, Neuweiler-Agenbach; Hermannus Schat, Freiburg i.Br.; Herbert Elmis, Denzlingen; Bernd Novotny, Gundelfingen; Otmar Kappeler, Neuenburg; Dietmar Ehrhardt, Freiburg i.Br., all of Fed. Rep. of Germany

[73] Assignee: Deutsche ITT Industries GmbH, Freiburg, Fed. Rep. of Germany

[21] Appl. No.: 899,973

[22] Filed: Aug. 25, 1986

[30] Foreign Application Priority Data

Aug. 27, 1985 [EP] European Pat. Off. ........ 85110735.9

[51] Int. Cl.⁴ .................... H04N 7/04; G06G 7/14; H03K 5/00
[52] U.S. Cl. .................... 358/143; 358/197; 370/20; 455/46; 455/202; 329/146; 329/167; 328/55; 328/133
[58] Field of Search ............. 358/143, 144, 197, 198; 370/20; 455/47, 60, 46, 202, 203; 329/110, 118, 146, 167; 328/55, 133

[56] References Cited

U.S. PATENT DOCUMENTS

| 4,241,451 | 12/1980 | Maixner et al. | 455/46 |
| 4,264,975 | 4/1981 | Voorman | 370/20 |
| 4,397,039 | 8/1983 | McAuliffe | 455/202 |
| 4,531,224 | 7/1985 | McCallister | 370/20 |
| 4,571,622 | 2/1986 | Davidov et al. | 358/197 |

FOREIGN PATENT DOCUMENTS 0146749 7/1985 European Pat. Off. .
2843977 4/1980 Fed. Rep. of Germany .

Primary Examiner—James J. Groody
Assistant Examiner—Michael D. Parker
Attorney, Agent, or Firm—T. L. Peterson

[57] ABSTRACT

A television sound receiving circuit for at least one sound channel contained in an RF signal converts the transmitted or already down-converted television signal as a composite signal to the baseband in a single-sideband demodulator circuit using the "phasing method", separates the first sound channel, corresponding to a lower sideband, and the second sound channel, corresponding to an upper sideband, and produces first and second sound signals at the desired frequency by subsequent frequency demodulation. Also shown are the interfaces for possible digitization and an advantageous use of the interfaces in which picture and sound signals are digitized together. The data can be combined into a single data stream which can be transferred over a bus system and is separable into the individual components if required.

21 Claims, 13 Drawing Figures

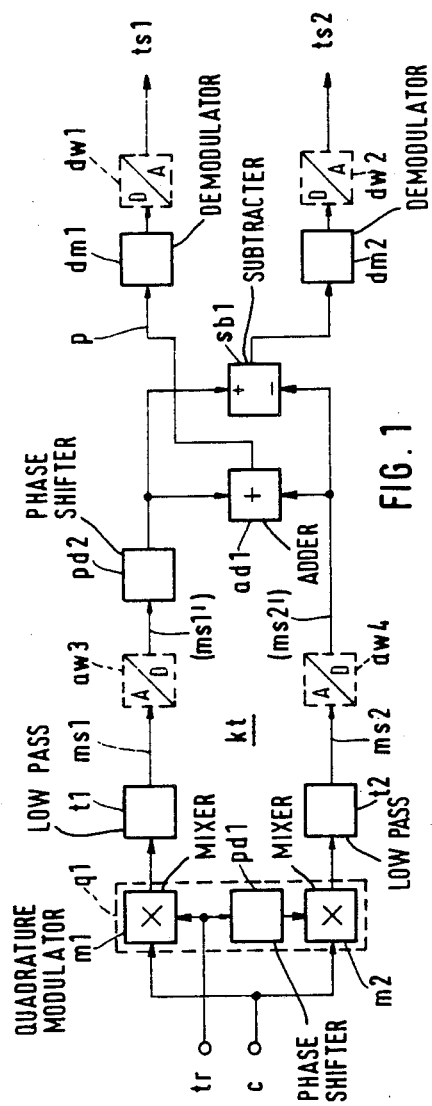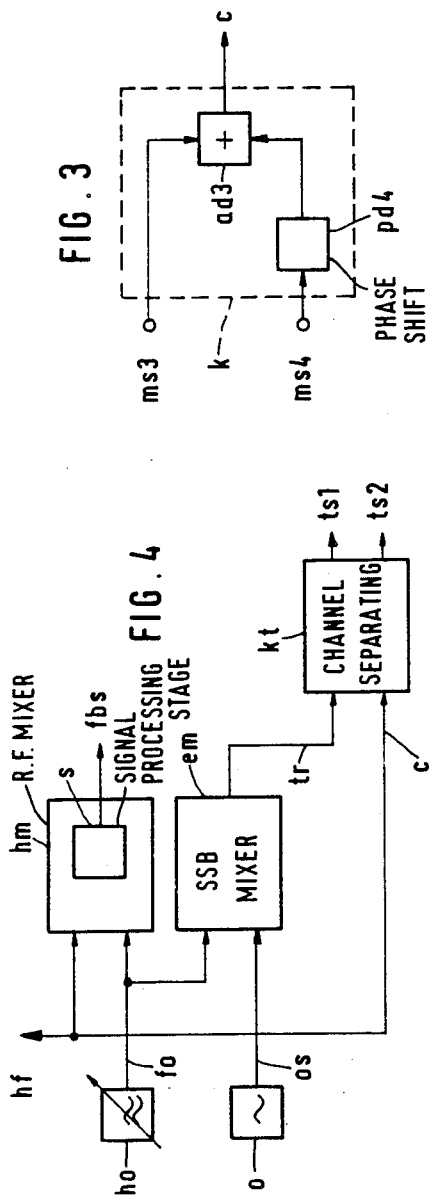

TELEVISION SOUND RECEIVING CIRCUIT FOR AT LEAST ONE SOUND CHANNEL CONTAINED IN AN RF SIGNAL

BACKGROUND OF THE INVENTION

The invention pertains to a television sound receiving circuit for at least one sound channel transmitted by means of a sound carrier and contained in an RF signal which also contains a composite color signal transmitted by means of a picture carrier and a chrominance subcarrier, with a channel-separating circuit.

Such circuits are utilized in a wide variety in conventional television receivers and are described in detail, cf., for example, the book by O. Limann entitled "Fernsehtechnik ohne Ballast", 13th Edition, Munich 1979, pages 86 to 91. In the circuits described, there are various noise sources inherent in the system which act on the sound signal. One of them is the intercarrier noise, which is caused by unwanted picture-carrier phase modulation that is hardly avoidable, particularly in translators. The phase modulation of the picture carrier is transmitted to the sound signal, with the interfering 5.5-MHz frequency being produced by mixing the picture carrier and the sound carrier. Intercarrier noise is particularly disturbing if characters with high light-dark contrast are displayed on the screen. In the video-frequency spectrum, such characters represent essentially a spectral line of large amplitude which gets into the 5.5-MHz frequency range by being mixed with the picture carrier.

Another noise source is the effect of the fine tuning of the receiver on volume, which may go to the point that, with a setting required to lock the receiver to a weak incoming television signal, there is no sound reproduction at all because of the fixed narrow bandwidth of the video filter.

In conventional circuits, the elimination of both of these two noise sources is not possible with a justifiable amount of circuitry.

SUMMARY OF THE INVENTION

It is, therefore, one object of the invention to provide a television sound receiving circuit which does not have the disadvantages described. Further objects are improved suitability for integration, elimination of alignment steps in the television set, and reduction of the number of components or circuits modules in the television set.

The invention is based on the idea to make a single-sideband demodulator circuit using the "phasing method", which is described in a book by H. Meinke and F. W. Gundlach, "Taschenbuch der Hochfrequenztechnik", 2nd Edition, Berlin 1962, pages 1497 to 1500, suitable for demodulating the sound signal contained in the television signal, which sound signal may consist of one or two sound channels.

In accordance with the invention a television sound receiving circuit for at least one sound channel contained in an RF signal converts the transmitted or already down-converted television signal as a composite signal to the baseband in a single-sideband demodulator circuit using the "phasing method", separates the first sound channel, corresponding to a lower sideband, and the second sound channel, corresponding to an upper sideband, and produces first and second sound signals at the desired frequency by subsequent frequency demodulation. Also shown are the interfaces for possible digitization and an advantageous use of the interfaces in which picture and sound signals are digitized together. The data can be combined into a single data stream which can be transferred over a bus system and is separable into the individual components if required.

BRIEF DESCRIPTION OF THE DRAWING

The invention will be better understood from a reading of the following detailed description in conjunction with the drawing in which:

FIG. 1 is a block diagram of an embodiment of a channel-separating circuit;

FIG. 3 shows another embodiment of the combination circuit;

FIG. 4 shows schematically the interconnection of a radio-frequency mixer, a single-sideband mixer, and the channel-separating circuit;

DETAILED DESCRIPTION

Figure 2:
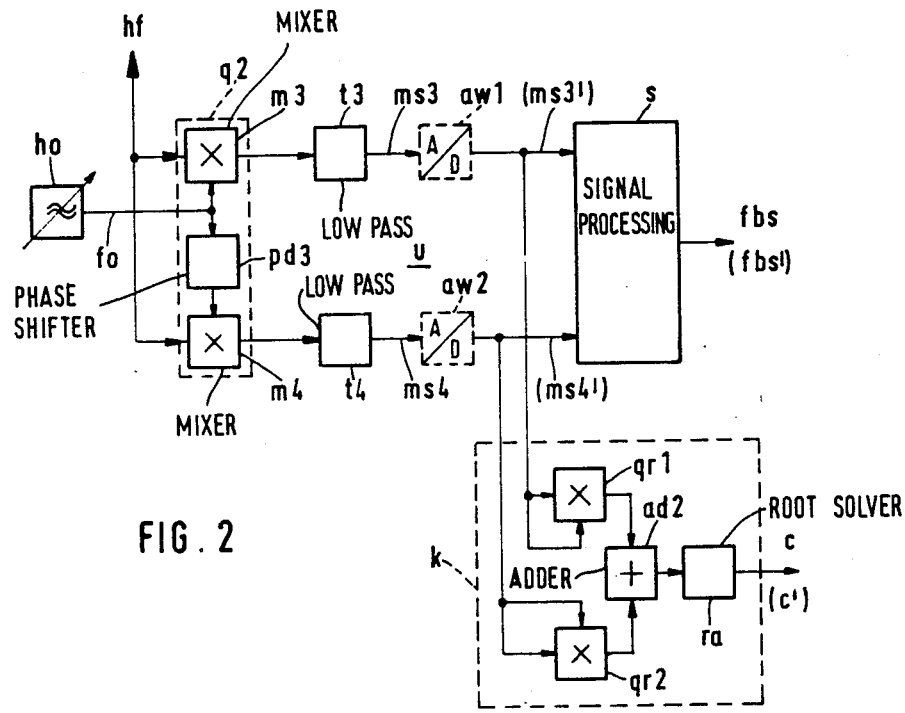
FIG. 2 is a block diagram of an embodiment of a converter and a combination circuit.

The block diagram of FIG. 1 shows an embodiment of the channel-separating circuit kt, which serves to separate the first sound channel and the second sound channel contained in the RF signal and delivers the sound signal ts1 of the first sound channel and the sound signal ts2 of the second sound channel in the desired audio-frequency range.

The signals applied to the channel-separating circuit kt are the composite signal c and the separating signal tr. The latter is of importance only with respect to its frequency, while the composite signal c is a signal mixture of different frequency which contains the first composite sound carrier tc1 and possibly the second composite sound carrier tc2.

At the input end, the channel-separating circuit kt contains the first quadrature modulator q1, which consists of the first phase-shift stage pd1, the first mixer unit m1, and the second mixer unit m2. The composite signal c is fed directly to the first and second mixer units m1, m2, while the separating signal tr is applied to the first mixer unit m1 directly and to the second mixer unit m2 through the first phase-shift stage pd1.

As is well known, quadrature modulators produce two output signals from an input signal which differ in phase by exactly 90° as far as possible. This is achieved by means of a 90° phase-shift stage.

Connected to the first and second outputs of the first quadrature modulator q1 are the first low-pass filter t1 and the second low-pass filter t2, respectively, whose outputs are the first mixer signal ms1 and the second mixer signal ms2, respectively, which may be amplified in a subsequent amplifier. The passband of each of the first and second low-pass filters t1, t2 is at least equal to the bandwidth of a sound channel frequency-modulated with its respective sound carrier tt1, tt2 in the base signal f, with the stop band chosen so that interfering adjacent signals are suppressed.

In the PAL color-television standard and the German television stereo sound standard, the first (frequency-modulated) sound carrier tt1 of the base signal f is at a frequency of 5.5 MHz. The frequency deviation of this sound carrier tt1 is ±50 KHz. Any second sound carrier that may be present, tt2, is located at a frequency of about 5.75 MHz, its frequency deviation being ±50 KHz, too.

The first mixer signal ms1 is fed to the second 90° phase-shift stage pd2, whose output is coupled to the first input of the first adder ad1 and to the minuend input of the first subtracter sb1. The second input of the first adder ad1 and the subtrahend input of the first subtracter sb1 are supplied with the second mixer signal ms2.

The output of the first adder ad1, which delivers the sum signal p (cf. FIG. 6c), is coupled to the input of the first frequency demodulator dm1, and the output of the first subtracter sb1 to the input of the second frequency demodulator dm2. The output of the first frequency demodulator dm1 is the first sound signal ts1 of the first sound channel, and that of the second frequency demodulator dm2 the second sound signal ts2 of the second sound channel, in the desired audio-frequency range.

According to an advantageous aspect of the invention, the interfaces for analog-to-digital conversion, indicated in FIG. 1 by the subcircuits drawn in broken lines, are located behind the first low-pass filter t1 and the second low-pass filter t2, respectively, because the first and second mixer signals ms1, ms2 have an upper cutoff frequency of about 200 kHz. Digitization is effected in synchronism with the system clock c1 or a lower-frequency signal derived therefrom. In television receivers with digital picture-signal-processing circuitry and in the present invention, the system clock c1 is preferably equal to four times the chrominance-subcarrier frequency, i.e., equal to 17.7 MHz in the PAL system. The first and second digitized mixer signals ms1, and ms2' are then fed to the above-described subcircuits, which are then corresponding digital subcircuits. To produce the first analog sound signal ts1 and the second analog sound signal ts2, the first frequency demodulator dm1 and the second frequency demodulator dm2 are followed by the first digital-to-analog converter dw1 and the second digital-to-analog converter dw2, respectively.

In its digital version, each of the first and second frequency demodulators dm1, dm2 contains an arctan device to which the signal to be frequency-demodulated is applied directly and through a delay circuit. The output signal is the arctan value formed from these two input values.

In the presence of the first and second composite sound carriers tc1, tc2, the frequency of the separating signal tr is chosen to lie approximately in the middle between the frequencies of these carriers. If only the first composite sound carrier tc1 is present, the frequency of the separating signal tr differs from that of the first composite sound carrier tc1 by the same amount.

FIG. 2 shows the interconnection of the converter u and the combination circuit k in a block diagram. In the converter u, the RF signal hf is converted in frequency by means of the oscillator signal fo to produce the composite color signal fbs in the baseband position. By means of the combination circuit k, the composite signal c is produced.

The input of the converter u contains the second quadrature modulator q2, which consists of the third mixer unit m3, the fourth mixer unit m4, and the third phase-shift stage pd3. The first inputs of the third and fourth mixer units m3, m4 are presented with the RF signal hf. The oscillator signal fo is applied to the second input of the third mixer unit m3 directly and to the second input of the fourth mixer unit m4 through the phase-shift stage pd3. It is the output signal of the tunable oscillator ho, whose tuning range extends approximately into the frequency range of the RF signal hf.

The third mixer unit m3 and the fourth mixer unit m4 are followed by the third low-pass filter t3 and the fourth low-pass filter t4, respectively, which deliver the third and fourth mixer signals ms3, ms4. These mixer signals may be amplified and are fed to the signal-processing stage s, which delivers the composite color signal fbs in the usual baseband position.

The passbands of the first and fourth low-pass filters t3, t4 are approximately equal to the bandwidth of the folded signal f*, and the stop bands are chosen so that the adjacent channels of the television signal are separated from the passbands in accordance with the standard. The folded signal f* is shown in FIG. 7c and will be explained below.

The third mixer signal ms3 and the fourth mixer signal ms4 are also fed, respectively, to the first squarer qr1 and the second squarer qr2 in the input portion of the combination circuit k. The output of each of the two squarers qr1, qr2 is connected to one of the inputs of the second adder ad2, whose output is fed to the root solver ra, which provides the composite signal c. The latter is the output signal of the combination circuit k and identical with the base signal f.

In an advantageous mode of operation of the converter u and the channel-separating circuit kt, the frequency of the oscillator ho and that of the oscillator signal fo lie within the RF signal spectrum approximately midway between the transmitted picture carrier bt+ and the transmitted chrominance subcarrier ft+. The third and fourth mixer signals ms3, ms4 are then the folded signal f*, which is the RF signal "folded", i.e., reversed, about the frequency of the oscillator signal fo. The oscillator signal fo "disappears", because it is transformed into the frequency origin 0 Hz by the folding process.

Part of the frequency range from 0 Hz is utilized doubly, however. As a result of the folding process, the original lower half of the spectral range, including the vestigal sideband, extends into the frequency range between the first transformed sound carrier tt1* and the second transformed sound carrier tt2*. The original upper range of the video-signal spectrum extends up to 2.8 MHz after the folding process, and the first and second transformed sound carriers tt1* and tt2*, which are adjacent to that range as a result of the folding process, are at 3.3 MHz and 3.55 MHz, respectively. Furthermore, the transformed picture carrier bt* and the transformed chrominance subcarrier ft* in the folded signal f* are located at a frequency of 2.2 MHz, cf. the explanations of FIG. 7c below.

Because of the frequencies of the third and fourth mixer signals ms3, ms4, which follow from the above-mentioned folding process, it is advantageous to digitize these signals with a system clock of about four times the frequency of the chrominance subcarrier ft. The appropriate interfaces in the converter u are at the outputs of the third low-pass filter t3 and the fourth low-pass filter t4, which are followed by the first analog-to-digital converter aw1 and the second analog-to-digital converter aw2, respectively (indicated by broken lines). The outputs of the two analog-to-digital converters are the third digitized mixer signal ms3' and the fourth digitized mixer signal ms4', respectively. The subcircuits following the two A/D converters operate digitally and produce the digitized composite color signal fbs' and the digitized composite signal c'.

The digitization of the four mixer signals ms1, ms2, ms3, ms4 by means of the four analog-to-digital converters aw1, aw2, aw3, aw4 offers the additional advantage that each of the preceding low-pass filters t1, t2, t3 t4 can be an easily realizable wide-tolerance analog preselector if the actual low-pass filter is a digital low-pass filter following the respective analog-to-digital converter. Critical tolerances and specific frequency responses are easier to realize, or realizable only, in digital form.

In a modification of the invention, which is not shown in the drawing, the converter u is an intermediate-frequency mixer circuit which converts the RF signal hf as the composite signal c to an intermediate-frequency range between the frequency range of the RF signal hf and that of the base signal f.

FIG. 3 shows another embodiment of the combination circuit k. The third mixer signal ms3 is fed to the first input of the third adder ad3. The second input of the latter is connected to the output of the fourth 90° phase-shift stage pd4, whose input is supplied with the fourth mixer signal ms4. The output of the third adder ad3 is the composite signal c. In this circuit arrangement, the composite signal c is one half f1* of the spectrum of the folded signal f*, which contains the first and second transformed sound carriers tt1*, tt2*, cf. the explanations of FIG. 7d below.

The third adder ad3 may be replaced by an additional subtracter whose minuend input is supplied with the third mixer signal ms3.

FIG. 4 shows schematically the interconnection of the radio-frequency mixer hm, the single-sideband mixer em, and the channel-separating circuit kt. The RF signal hf is applied to the RF input of the radio-frequency mixer hm and to the composite-signal input of the channel-separating circuit kt. The signal fo of the oscillator ho is applied to the oscillator-signal inputs of the radio-frequency mixer hm and the single-sideband mixer em. The signal os of the beat-frequency oscillator o is fed to the other input of the single-sideband mixer em, whose output, the separating signal tr, is applied to the channel separating circuit kt.

The beat-frequency oscillator o is a fixed-frequency oscillator whose frequency is mixed with that of the tunable oscillator ho in the single-sideband mixer em to produce a sum frequency which is the frequency of the separating signal tr. The frequency of the beat-frequency oscillator o is approximately the center frequency between the frequencies of the first and second transformed sound carriers tt1*, tt2*, in the folded signal f*, the second transformed sound carrier tt2* need not be present in reality but can be derived, for example, in accordance with a television stereo or twin-channel sound standard.

The oscillator signal fo serves to reduce the RF signal hf in frequency. Advantageously, the oscillator ho is set to a frequency approximately in the middle between the transmitted picture carrier bt+ and the transmitted chrominance subcarrier ft+.

The radio-frequency mixer hm contains the signal-processing stage s, which is supplied with the third and fourth mixer signals (not shown) and provides the composite color signal fbs in the baseband position.

Figure 5:
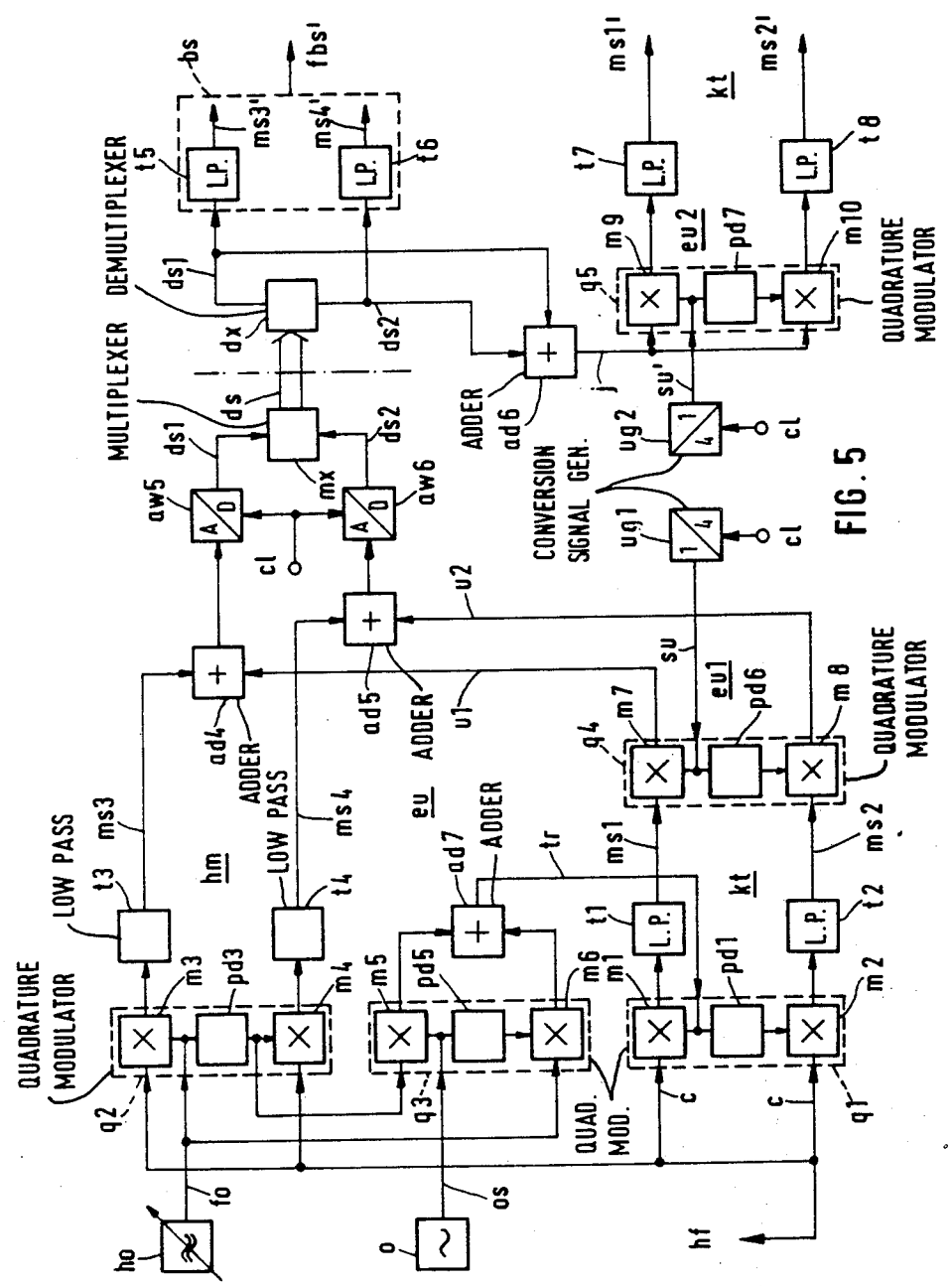
FIG. 5 is a block diagram of an embodiment of the converter and the channel-separating circuit with common digital picture- and sound-processing circuitry and subsequent signal separation.

FIG. 5 shows how, in a further embodiment of the invention, the signals provided by the radio-frequency mixer hm and the channel-separating circuit kt can be digitized jointly and then separated again for further processing.

As a result—and this is the main advantage of this arrangement—, the third and fourth low-pass filters t3, t4 are no longer contained in the sound-signal path as in FIG. 2, where the sound signals are reduced in amplitude by the two low-pass filters ahead of the analog-to-digital converters, which is undesirable. Another advantage is that the resulting data can be transferred over a common data bus, so that the number of terminals of the integrated circuits involved can be reduced. In addition, the joint digitization reduces the number of analog-to-digital converters required.

Like in FIG. 1, the input portion of the channel-separating circuit kt contains the first quadrature modulator q1 with the first and second mixer units m1, m2. The latter are supplied with the RF signal hf as the composite signal c. The first and second mixer units feed into the first low-pass filter t1 and the second low-pass filter t2, respectively. The output of the first low-pass filter t1, the first mixer signal ms1, and the output of the second low-pass filter t2, the second mixer signal ms2, are fed to the fourth quadrature modulator q4. The latter converts the first and second mixer signals ms1, ms2 to the frequency of the conversion signal su. The frequency of the conversion signal su is preferably equal to a quarter of the frequency of the system clock c1, which is supplied to and frequency-divided by the first conversion-signal generator ug1.

The RF signal hf is also applied to the two inputs of the second quadrature modulator q2 and therein to one input of each of the third and fourth mixer units m3, m4. The other input of the third mixer unit m3 is supplied with the signal fo from the oscillator ho, which also feeds the third phase-shift stage pd3 in the second quadrature modulator q2. The output of the third phase-shift stage pd3 is fed to the other input of the fourth mixer unit m4 and to the input of the third quadrature modulator q3.

The third quadrature modulator q3, containing the fifth and sixth mixer units m5, m6 and the fifth phase-shift stage pd5, and the seventh adder ad7 form the single-sideband mixer em, which adds the frequency of the oscillator ho and that of the beat-frequency oscillator o, whose output signal is designated os, and produces the separating signal tr of this sum frequency.

To this end, the oscillator signal fo is applied to one input of the sixth mixer unit m6 directly, and to one input of the fifth mixer unit m5 after being shifted in phase by 90 degrees. This phase shift is produced by the third phase-shift stage pd3 in the second quadrature modulator q2.

The other inputs of the fifth mixer unit m5 and the fifth phase-shift stage pd5 are supplied with the beat-oscillator signal os. The fifth phase-shift stage pd5 also feeds the mixer unit m6. The output of the latter and that of the fifth mixer unit m5 are each applied to one of the two inputs of the seventh adder ad7, whose output is the separating signal tr. This signal is applied to the first mixer unit m1 and the first phase-shift stage pd1 of the first quadrature modulator q1.

The third mixer unit m3 and the fourth mixer unit m4 are followed by the third low-pass filter t3 and the fourth low-pass filter t4, respectively. The passbands of the latter are equal to the frequency range of the folded signal f*, and the filter outputs, the third mixer signal ms3 and the fourth mixer signal ms4, are applied to one input of the fourth adder ad4 and to one input of the fifth adder ad5, respectively. The other inputs of these adders are supplied, respectively, with the output of the seventh mixer unit m7, which is the first converted signal u1, and the output of the eighth mixer unit m8, which is the second converted signal u2. The fourth quadrature modulator q4 further includes the sixth phase-shift stage pd6, which has its input connected to the seventh mixer unit m7 and the first conversion-signal generator ug1. Its output is coupled to the eighth mixer unit m8.

The outputs of the fourth adder ad4 and the fifth adder ad5 are digitized by means of the fifth analog-to-digital converter aw5 and the sixth analog-to-digital converter aw6, respectively, which are supplied with the system clock c1 and whose outputs, the first and second data streams ds1, ds2, are fed to the multiplexer mx. The output of the latter is the common data stream ds, which can be transferred in coded form over a single data bus which has further circuits connected to it and feeds the demultiplexer dx. The outputs of the latter are again the first and second data streams ds1, ds2, which are each applied to one of the inputs of the picture-signal-processing stage bs, where they are fed to the fifth low-pass filter t5 and the sixth low-pass filter t6, respectively.

The passbands of these filters are approximately equal to the frequency range of the folded signal f*. The stop bands, besides rejecting signals on adjacent channels, include a range in which the frequency of the conversion signal su is suppressed. The outputs of the two low-pass filters t5 and t6 are the digitized third mixer signal ms3' and the digitized fourth mixer signal ms4', respectively, from which the digital picture-signal-processing stage bs derives the digitized composite color signal fbs'.

By reconversion, the first and second data streams ds1, ds2 are changed back to the first and second mixer signals ms1, ms2 of the channel-separating stage. To this end, the first and second data streams ds1, ds2 are added by means of the sixth adder ad6, whose output j is fed to the inputs of the ninth and tenth mixer units m9, m10 in the fifth quadrature modulator q5. The other inputs of these mixer units are supplied, respectively, with the digital conversion signal su' and the output of the seventh phase-shift stage pd7, whose input is presented with the digital conversion signal su', too. The latter is generated by means of the second conversion-signal generator ug2, which is controlled by the system clock c1 and contains a divide-by-4 frequency divider.

Since the second single-sideband converter eu2, comprising the fifth quadrature modulator q5, is a digital-signal-processing circuit, the second conversion-signal generator ug2 is a digital circuit, too. Because of the integral frequency ratio between the input and the output of this generator, the circuit is particularly easy to implement. In the simplest case, the digital conversion signal su' assumes only three different values; one of them is zero, and the two other differ only by their signs.

The sixth adder ad6 may also, of course, be connected directly to the fifth and sixth analog-to-digital converters aw5, aw6, particularly if no common data stream ds is to be generated by means of the multiplexer mx. The output signal j of the sixth adder ad6 will be explained below with reference to FIG. 7e.

The outputs of the ninth mixer unit m9 and the tenth mixer unit m10 are connected, respectively, to the seventh low-pass filter t7 and the eight low-pass filter t8, whose output signals are the digitized first and second mixer signals ms1', ms2' of the channel separating circuit kt. The pass and stop bands of the seventh and eight low-pass filters are equal to those of the first and second low-pass filters t1, t2.

The further processing of the first and second digitized mixer signals ms1', ms2' is not shown in FIG. 5. It corresponds to the further processing of the first and second sound signals ts1, ts2, which was described above with the aid of FIG. 1.

Figure 6A:
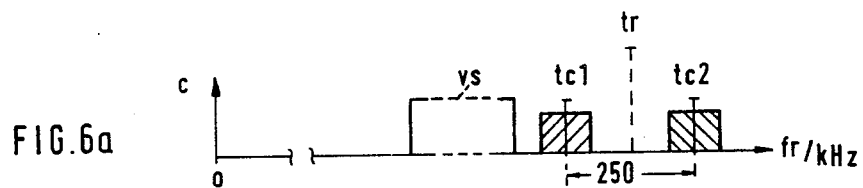
FIGS. 6a–6c shows schematically the spectra of a few signals of the channel-separating circuit.
Figure 6B:
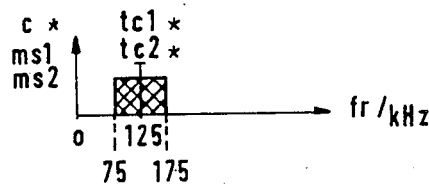

FIG. 6a shows schematically the spectrum of the composite signal c and the frequency of the associated separating signal tr. Located beside the spectra of the first and second sound channels with the first and second composite sound carriers tc1, tc2 is the spectral range of the video signal vs. The ranges of the frequency-modulated first and second sound channels are centered about the first composite sound carrier tc1 and the second composite sound carrier tc2, respectively. The frequency of the separating signal tr is located exactly in the middle between the first and second composite sound carriers tc1, tc2.

FIG. 6a shows the composite signal c* folded into the baseband by means of the separating signal tr after the first and second low-pass filters t1, t2 namely the first and second mixer signals ms1, ms2. The spectrum of the video signal vs is suppressed by means of the first and second low-pass filters t1,t2. This leaves the equal-frequency ranges of the first and second sound channels about the first and second transformed composite sound carriers tc1*, tc2*, which both have a frequency of 125 KHz. As the frequency deviation is ±50 KHz, the spectral range of the first and second sound channels extends from 75 to 175 KHz. The separation or "defolding" of these two sound channels of equal frequency is effected by means of the first adder ad1 and the first subtracter sb1.

Figure 6C:
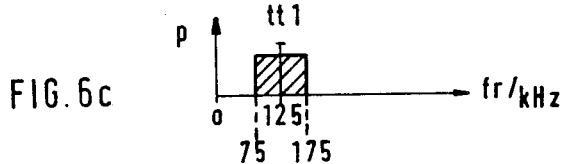

As an example of the "defolded" composite sound signal, FIG. 6c shows the sum signal p of the first adder ad1. Centered about the first sound carrier tt1 at 125 KHz is the range of the first frequency-modulated sound channel from 75 KHz to 175 KHz.

Figure 7A:
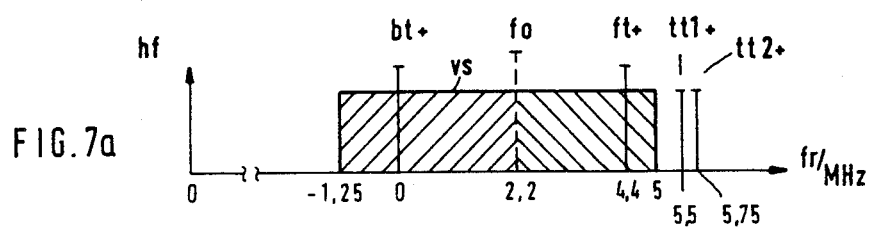
FIGS. 7a–7e shows schematically the spectra of a few signals of different embodiments of the overall circuit.

FIG. 7a is a simplified, schematic representation of the spectrum of the RF signal hf, normalized to the frequency of the transmitted picture carrier bt+. The spectrum of the video signal vs, transmitted as a vestigal sideband, extends from −1.25 MHz to +5 MHz. The transmitted chrominance subcarrier ft+ is shown at 4.4 MHz for the sake of simplicity. Located above the video-signal spectrum are the transmitted carriers of the first sound channel tt1+ and the second sound channels tt2+ at 5.5 MHz and approximately 5.75 MHz, respectively.

Also shown in the oscillator signal fo, which is located in the middle between the transmitted picture carrier bt+ and the transmitted chrominance subcarrier ft+ at the normalized frequency 2.2 MHz. The oscillator signal fo does not form part of the RF signal hf, however.

In the intermediate-frequency mixer circuit, by means of which the RF signal hf is converted as the composite signal c to an intermediate-frequency range lying between the frequency range of the RF signal hf and that of the base signal f, the schematic spectral distribution is the same as in the composite signal c except that it is shifted toward lower frequencies.

Figure 7B:
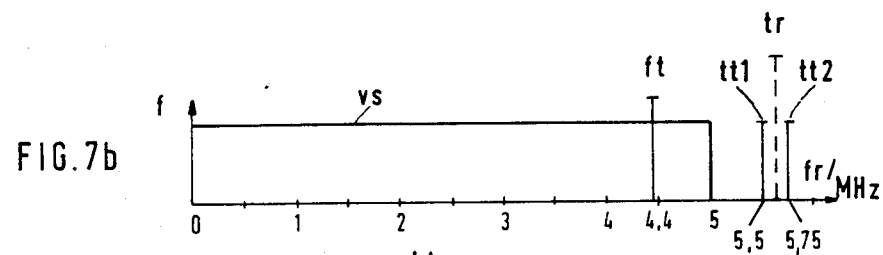
Figure 7C:
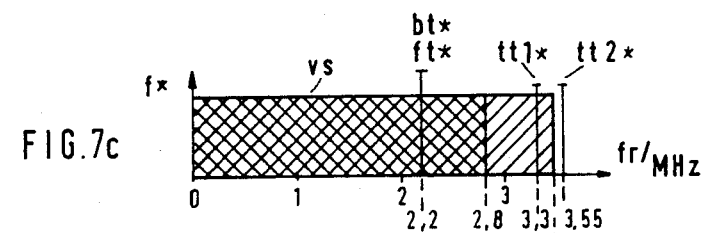

FIG. 7b shows the base signal f in the baseband position. Starting at the frequency 0 Hz, the spectrum of the video signal vs extends up to 5 MHz. The chrominance subcarrier ft is located at 4.4 MHz (see above), and the first and second sound carriers tt1, tt2 are at 5.5 MHz and 5.75 MHz, respectively (see above). Centered about the first and second sound carriers tt1, tt2 are the first and second sound channels (not shown), respectively, which are modulated with a frequency deviation of ±50 kHz.

FIG. 7c is a simplified schematic representation of the spectrum of the folded signal f*, which corresponds to the third and fourth mixer signals ms3, ms4. As a result of the reversal ("folding") with the oscillator signal fo, part of the spectrum in the baseband is utilized doubly. The spectrum of the RF signal hf appears "reversed" about the oscillator signal fo toward higher frequency values, with the oscillator signal fo itself being no longer present after the reversal because it is transformed into the frequency origin 0 Hz.

The spectrum below the oscillator signal fo with the vestigal sideband extends in the folded signal f* from 0 to 3.45 MHz. Its upper end thus lies between the first transformed sound carrier tt1* and the second transformed sound carrier tt2*, which are at 3.3 MHz and 3.55 MHz, respectively. The spectral range of the video signal vs, originally located above the oscillator signal fo, extends from 0 to 2.8 MHz. Located at 2.2 MHz are the transformed picture carrier bt* and the transformed chrominance subcarrier ft*.

Figure 7D:
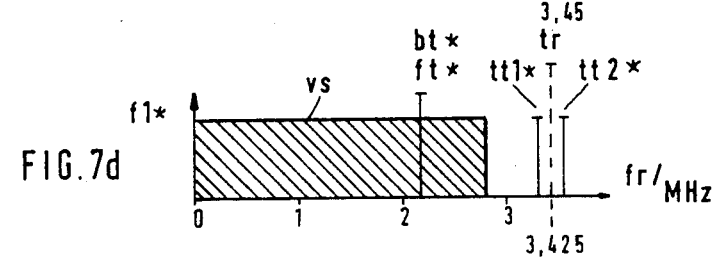

FIG. 7d shows in simplified form one half f1* of the spectrum of the folded signal f*. This half contains the upper spectral portion of the video signal vs at the first and second transformed sound carriers tt1*, tt2*. The other half of the folded signal f* is suppressed by the "phasing method".

Also shown is the separating signal tr, which lies in the middle between the first and second transformed sound carriers tt1*, tt2* at the normalized frequency 3.425 MHz. The separating signal does not form part of the folded signal f*.

Figure 7E:
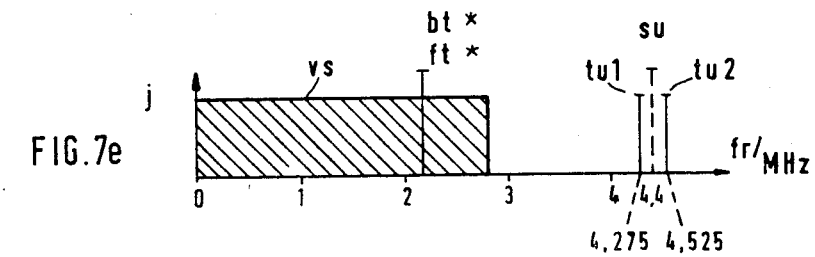

FIG. 7e shows the output signal j of the sixth adder ad6. Starting at 0 Hz, the upper half of the video-signal spectrum vs with the transformed picture carrier bt* and the transformed chrominance subcarrier ft* at 2.2 MHz is shown. The upper limit of the video-signal spectrum is at 2.8 MHz. At frequency intervals of 125 kHz above and below the conversion signal su shown at 4.4 MHz, the first and second converted sound carries tu1, tu2 are located at frequencies of 4.275 MHz and 4.525 MHz, respectively.

The frequency conversion in which the RF signal hf is converted by means of an oscillator signal fo whose frequency is the exact center frequency between the transmitted picture carrier bt+ and the transmitted chrominance subcarrier ft+ is also referred to as "central reversal" ("Zentralfaltung") and is described in Offenlegungsschrift DE-A 33 13 867. Due to inequalities, this results in a spurious signal in the two signal paths involved which produces moire on the television screen.

A method of making such moire invisible to the television viewer is described in our copending Patent filed on even date herewith and assigned to a common assignee.

There, the oscillator signal fo is no longer set to the exact center frequency between the transmitted picture carrier bt+ and the transmitted chrominance subcarrier ft+ but is shifted in frequency by the following amounts:

(a) in the PAL color-television standard:
$-(\frac{3}{8}+n)fz$ or $+(\frac{5}{8}+n)fz$.

(b) in the NTSC color-television standard:
$-(\frac{1}{4}+n)fz$ or $+(\frac{3}{4}+n)fz$, where n=0, 1, 2, 3 . . . , fz=horizontal frequency, and "−" and "+"=direction of frequency shift toward lower and higher values, respectively. This frequency shift can be used in a further embodiment of the present invention.

What is claimed is:

1. A channel separating circuit for use in a television sound receiving circuit for at least one sound channel transmitted by means of a sound carrier and contained in an RF signal which also contains a composite color signal transmitted by means of a picture carrier and a chrominance subcarrier, said channel separating circuit comprising:

a single-sideband demodulator using the "phasing method" and having an output for a first sideband and an output for a second sideband, and comprising:

a first quadrature modulator to which a composite signal and a separating signal are fed as signals to be mixed, said composite signal containing a first composite sound carrier or a first composite sound carrier and a second composite sound carrier;

first and second low pass filters connected, respectively, to first and second outputs of said first quadrature modulator to provide a first mixer signal and a second mixer signal, the passband of each of said first and second low pass filters being at least equal to the bandwidth of a sound channel frequency modulated about its sound carrier in a base signal, the stop band of each of said first and second low pass filters being chosen to suppress signals on adjacent channels;

a 90° phase-shift stage having its input coupled to the output of said first low-pass filter;

a first adder having one input coupled to the output of said 90° phase-shift stage, a second input coupled to the output of said second low pass filter;

a first subtracter having a minuend input coupled to said 90° phase-shift stage output, a subtrahend input connected to said second low pass filter output;

a first frequency demodulator having its input coupled to the sum output of said first adder and having an output which is the sound signal of the first sound channel in the desired audio-frequency range; and a second frequency demodulator having its input coupled to the output of said first subtracter and having an output which is the sound signal of the second sound channel in the desired audio-frequency range;

said RF signal being applied as the composite signal directly to said channel-separating circuit; and wherein the frequency of said separating signal is set so that, in the presence of said first and second composite sound carriers, it lies approximately in the middle between the frequencies of said first and second composite sound carriers, and it has the same frequency deviation from the first composite sound carrier in the presence of only said first composite sound carrier.

2. A channel separating circuit for use in a television sound receiving circuit for at least one sound channel transmitted by means of a sound carrier and contained in an RF signal which also contains a composite color signal transmitted by means of a picture carrier and a chrominance subcarrier, said channel separating circuit comprising:

a single-sideband demodulator using the "phasing method" and having an output for a first sideband and an output for a second sideband, and comprising:

a first quadrature modulator to which a composite signal and a separating signal are fed as signals to be mixed, said composite signal containing a first composite sound carrier or a first composite sound carrier and a second composite sound carrier;

first and second low pass filters connected, respectively, to first and second outputs of said first quadrature modulator to provide a first mixer signal and a second mixer signal, the passband of each of said first and second low pass filters being at least equal to the bandwidth of a sound channel frequency modulated about its sound carrier in a base signal, the stop band of each of said first and second low pass filters being chosen to suppress signals on adjacent channels;

a 90° phase-shift stage having its input coupled to the output of said first low-pass filter;

a first adder having one input coupled to the output of said 90° phase-shift stage, a second input coupled to the output of said second low pass filter;

a first subtracter having a minuend input coupled to said 90° phase-shift stage output, a subtrahend input connected to said second low pass filter output;

a first frequency demodulator having its input coupled to the sum output of said first adder and having an output which is the sound signal to the first sound channel in the desired audio-frequency range; and a second frequency demodulator having its input coupled to the output of said first subtracter and having an output which is the sound signal of the second sound channel in the desired audio-frequency range;

a converter having an input receiving said RF signal;

a combination circuit connected between said converter circuit and said first quadrature modulator to supply said composite signal; and wherein the frequency of said separating signal is set so that, in the presence of said first and second composite sound carriers, it lies approximately in the middle between the frequencies of said first and second composite sound carriers, and it has the same frequency deviation from the first composite sound carrier in the presence of only said first composite sound carrier.

3. A television circuit in accordance with claim 1, comprising:

an oscillator to provide an oscillator signal;

a beat frequency oscillator having an output at a fixed frequency approximately equal to the center frequency between the frequencies of a first transformed sound carrier and a second transformed sound carrier in a folded signal of which the second transformed sound carrier need not be present; and a single-sideband mixer supplied with said oscillator signal and said beat frequency oscillator output and having a sum frequency equal to the frequency of the separating signal, said single sideband mixer producing said separating signal.

4. A television circuit in accordance with claim 2, wherein:

said converter is an intermediate-frequency mixer circuit which converts said RF signal as a composite signal to an intermediate-frequency range between the frequency range of said RF signal and that of said base signal.

5. A television circuit in accordance with claim 2, wherein:

said converter includes:

a second quadrature modulator supplied with said RF signal and with an oscillator signal whose frequency lies within the RF signal spectrum approximately in the middle between the transmitted picture carrier and the transmitted chrominance subcarrier;

third and fourth low-pass filters connected respectively to the first and second outputs of said second quadrature modulator to provide a third mixer signal and a fourth mixer signal, the passbands of said third and fourth low-pass filters being approximately equal to the bandwidth of the folded signal, the top bands of said third and fourth low-pass filters being chosen so that the adjacent channels of the television signal are separated from said passbands in accordance with a television standard;

a signal processing stage supplied with said third and fourth mixer signals to provide the composite color signal in the usual baseband position; and said combination circuit is supplied with said third and fourth mixer signals.

6. A television circuit in accordance with claim 5, wherein:

said combination circuit comprises:

a first squarer having two inputs each receiving said third mixer signal;

a second squarer having two inputs each receiving said fourth mixer signal;

a second adder having its two inputs connected to the outputs of said first and second squarers, respectively; and a root solver having its inputs connected to the output of said second adder, the output of said root solver being the composite signal.

7. A television circuit in accordance with claim 5, wherein said combination circuit comprises:

a fourth 90° phase shift stage having its input receiving one of said third or fourth mixer signals; and an arithmetic circuit having a first input receiving the other of said third or fourth mixer signals and a second input coupled to the output of said fourth 90° phase shift stage and for forming the sum or difference of its first and second inputs and to provide at its output a composite signal which is one half of the spectrum of the folded signal, said half containing at least a first transformed sound carrier.

8. A television circuit in accordance with claim 2, wherein:
said converter comprises a second quadrature modulator receiving said RF signal and an oscillator signal having a frequency lying within the RF signal spectrum approximately in the middle between the transmitted picture carrier and the transmitted chrominance subcarrier, said second quadrature modulator having first and second outputs;
third and fourth low-pass circuits connected respectively to said first and second outputs of said second quadrature modulator and providing third and fourth mixer signal outputs, said third and fourth low pass circuits each having passbands approximately equal to the bandwidth of the folded signal and having stop bands such that adjacent channels of the television signal are separated from said passband in accordance with predetermined standards; and
a signal processing stage having inputs receiving said third and fourth mixer signals and provides a composite color signal in the baseband position.

9. A television circuit in accordance with claim 5, wherein:
the frequency of said oscillator signal is shifted with respect to the exact center frequency between the transmitted picture carrier and the transmitted chrominance subcarrier by the following amounts for PAL color television standards $-(\frac{3}{8}+n)fz$ or $+(\frac{3}{8}+n)fz$ where $n=0, 1, 2, 3, \ldots$, $fz=$horizontal frequency, and "−" and "+"=direction of frequency shift toward lower and higher values, respectively.

10. A television circuit in accordance with claim 6, wherein:
the frequency of said oscillator signal is shifted with respect to the exact center frequency between the transmitted picture carrier and the transmitted chrominance subcarrier by the following amounts for PAL color television standards $-(\frac{3}{8}+n)fz$ or $+(\frac{3}{8}+n)fz$ where $n=0, 1, 2, 3, \ldots$, $fz=$horizontal frequency, and "−" and "+"=direction of frequency shift toward lower and higher values, respectively.

11. A television circuit in accordance with claim 7, wherein:
the frequency of said oscillator signal is shifted with respect to the exact center frequency between the transmitted picture carrier and the transmitted chrominance subcarrier by the following amounts for PAL color television standards $-(\frac{3}{8}+n)fz$ or $+(\frac{3}{8}+n)fz$ where $n=0, 1, 2, 3, \ldots$, horizontal frequency, and "−" and "+"=direction of frequency shift toward lower and higher values, respectively.

12. A television circuit in accordance with claim 8, wherein:
the frequency of said oscillator signal is shifted with respect to the exact center frequency between the transmitted picture carrier and the transmitted chrominance subcarrier by the following amounts for PAL color television standards $-(\frac{3}{8}+n)fz$ or $+(\frac{3}{8}+n)fz$ where $n=0, 1, 2, 3, \ldots$, $fz=$horizontal frequency, and "−" and "+"=direction of frequency shift towards lower and higher values, respectively.

13. A television circuit in accordance with claim 5, wherein:
the frequency of said oscillator signal is shifted with respect to the exact center frequency between the transmitted picture carrier and the transmitted chrominance subcarrier by the following amounts for NTSC color television standards $-(\frac{1}{4}+n)fz$ or $+(\frac{3}{4}+n)fz$ where $n=0, 1, 2, 3, \ldots$, $fz=$horizontal frequency, and "−" and "+"=direction of frequency shift toward lower and higher values, respectively.

14. A television circuit in accordance with claim 6, wherein:
the frequency of said oscillator signal is shifted with respect to the exact center frequency between the transmitted picture carrier and the transmitted chrominance subcarrier by the following amounts for NTSC color television standards $-(\frac{1}{4}+n)fz$ or $+(\frac{3}{4}+n)fz$ where $n=0, 1, 2, 3, \ldots$, $fz=$horizontal frequency, and "−" and "+"=direction of frequency shift toward lower and higher values, respectively.

15. A television circuit in accordance with claim 7, wherein:
the frequency of said oscillator signal is shifted with respect to the exact center frequency between the transmitted picture carrier and the transmitted chrominance subcarrier by the following amounts for NTSC color television standards $-(\frac{1}{4}+n)fz$ or $+(\frac{3}{4}+n)fz$ where $n=0, 1, 2, 3, \ldots$, $fz=$horizontal frequency, and "−" and "+"=direction of frequency shift toward lower and higher values, respectively.

16. A television circuit in accordance with claim 8, wherein:
the frequency of said oscillator signal is shifted with respect to the exact center frequency between the transmitted picture carrier and the transmitted chrominance subcarrier by the following amounts for NTSC color television standards $-(\frac{1}{4}+n)fz$ or $+(\frac{3}{4}+n)fz$ where $n=0, 1, 2, 3, \ldots$, $fz=$horizontal frequency, and "−" and "+"=direction of frequency shift toward lower and higher values, respectively.

17. A television circuit in accordance with claim 5, comprising:
a first analog-to-digital converter coupled to the output of said third low-pass filter for digitizing said third mixer signal; and
a second analog-to-digital converter coupled to the output of said fourth low-pass filter for digitizing said fourth mixer signal.

18. A television circuit in accordance with claim 1, comprising:
a third analog-to-digital converter coupled to the output of said first low pass filter for digitizing said first mixer signal;
a fourth analog-to-digital converter coupled to the output of said second low pass filter for digitizing said second mixer signal;
a first digital to analog converter connected to the output of said first frequency demodulator to produce a first analog sound signal; and
a second digital to analog converter connected to the output of said second frequency demodulator to produce a second analog sound signal.

19. A television circuit in accordance with claim 8, comprising:

a third analog-to-digital converter coupled to the output of said first low pass filter for digitizing said first mixer signal;

a fourth analog-to-digital converter coupled to the output of said second low pass filter for digitizing said second mixer signal;

a first digital to analog converter connected to the output of said first frequency demodulator to produce a first analog sound signal; and a second digital to analog converter connected to the output of said second frequency demodulator to produce a second analog sound signal.

20. A television circuit in accordance with claim 7, comprising:

a first single-sideband converter supplied with said first and second mixer signals and a conversion signal whose frequency is an integral fraction, preferably one quarter, of the frequency of the system clock controlling the digitization;

a fourth adder followed by a fifth analog-to-digital converter, the two inputs of said fourth adder being supplied with the first output signal of said first single-sideband converter, representing a first converted signal, and a third mixer signal, respectively;

a fifth adder followed by a sixth analog-to-digital converter, the two inputs of said fifth adder being supplied with the second output signal of said first single-sideband converter, representing a second converted signal, and a fourth mixer signal, respectively;

the outputs of said fifth and sixth analog-to-digital converters are fed as a first data stream and a second data stream, respectively;

directly to the two inputs of a digital picture-signal-processing stage and to the two inputs of a sixth adder;

said digital picture-signal-processing stage having an input portion including a fifth low-pass filter and a sixth low-pass filter with a stop band for the frequency of the conversion signal and a passband approximately equal to the bandwidth of the folded signal; and the output signal of said sixth adder and a digital conversion signal equal in frequency to the conversion signal are each applied to one of the two inputs of a second single-sideband converter whose first and second outputs, after being filtered in a seventh low-pass filter and an eighth low-pass filter, respectively, represent a first digitized mixer signal, corresponding to the first mixer signal of the channel-separating circuit, and a second digitized mixer signal, corresponding to the second mixer signal of the channel-separating circuit, with the pass and stop bands of the seventh and eighth low-pass filters being equal to those of the first and second low-pass filters.

21. A television circuit in accordance with claim 7, comprising:

a first single-sideband converter supplied with said first and second mixer signals and a conversion signal whose frequency is an integral fraction, preferably one quarter, of the frequency of the system clock controlling the digitization;

a fourth adder followed by a fifth analog-to-digital converter, the two inputs of said fourth adder being supplied with the first output signal of said first single-sideband converter, representing a first converted signal, and a third mixer signal, respectively;

a fifth adder followed by a sixth analog-to-digital converter, the two inputs of said fifth adder being supplied with the second output signal of said first single-sideband converter, representing a second converted signal, and a fourth mixer signal, respectively;

the outputs of said fifth and sixth analog-to-digital converters are fed as a first data stream and a second data stream, respectively;

to the first and second inputs of a multiplexer whose output feeds the input of a demultiplexer delivering the first and second data streams which are each fed to one of the two inputs of a digital picture-signal-processing stage and to one of the two inputs of a sixth adder;

said digital picture-signal-processing stage having an input portion including a fifth low-pass filter and a sixth low-pass filter with a stop band for the frequency of the conversion signal and a passband approximately equal to the bandwidth of the folded signal; and the output signal of said sixth adder and a digital conversion signal equal in frequency to the conversion signal are each applied to one of the two inputs of a second single-sideband converter whose first and second outputs, after being filtered in a seventh low-pass filter and an eighth low-pass filter, respectively, represent a first digitized mixer signal, corresponding to the first mixer signal of the channel-separating circuit, and a second digitized mixer signal, corresponding to the second mixer signal of the channel-separating circuit, with the pass and stop bands of the seventh and eighth low-pass filters being equal to those of the first and second low-pass filters.

* * * * *